Dec. 3, 1957 C. G. SMITH 2,815,303

METHOD OF MAKING JUNCTION SINGLE CRYSTALS

Filed July 24, 1953

INVENTOR
CHARLES G. SMITH
BY
ATTORNEY 2,815,303

METHOD OF MAKING JUNCTION SINGLE CRYSTALS

Charles G. Smith, Weston, Mass., assignor to Raytheon Manufacturing Company, Newton, Mass., a corporation of Delaware Application July 24, 1953, Serial No. 370,107

4 Claims. (Cl. 148—1.5)

This invention relates to a method of making junction type semiconductor single crystals, and more particularly to coaxial single crystals of the p-n type.

In the production of transistors and crystal diode devices, the problem of forming semiconductor single crystals of the junction type is one of considerable difficulty, and normally necessitates the use of complicated techniques and elaborate crystal-growing equipment. This invention involves a novel method of making single crystals of the p-n type wherein relatively simple techniques and equipment may be employed. This simplification is achieved by utilizing the differences in the rates of evaporation of the n-type and p-type elements used to dope the semiconductor material.

For example, one innovation of this invention involves the use of a crystal-growing mold adapted to hold a melt of semiconductor material, such as germanium. This melt may be doped with a predetermined concentration of an n-type and a p-type element, such as arsenic, an n-type element, and boron, a p-type element. In this particular embodiment, the concentration of arsenic, which has the higher rate of evaporation, should exceed that of the boron in the melt. The melt is then forced into needle-shaped holes within the mold, and the temperature of the melt is decreased to form a plurality of needle-like single crystals. These crystals will be n-type at this stage of the process because the concentration of n-type arsenic exceeds that of the p-type boron. The crystals may be removed from the mold, separated and placed in an evacuated oven where they are heated to about 500 degrees C. Under these conditions arsenic is quite volatile and its rate of evaporation from the germanium crystal is high. Therefore, arsenic will begin to leave the surface of the crystals. However, boron, which has a very low rate of evaporation, will remain evenly distributed throughout the crystals. Thus, an outer layer adjacent to the surface of each crystal will be created in which there is a deficiency of arsenic or, in other words, an excess of p-type material, namely boron. The inner core of the crystal, where the arsenic is subject to the evaporation process to a lesser degree, will still contain a sufficient concentration of arsenic to overcome the p-type characteristics of th boron. Therefore, a coaxial junction-type single crystal having an exterior or outer layer of p-type semiconductor material and an inner core of n-type semiconductor material will be produced. By connecting leads to these layers and encapsulating the device, a transistor or a crystal diode may be fabricated.

This invention and the features thereof will be understood more clearly and fully from the following detailed description of one embodiment of the invention with reference to the accompanying drawing wherein.

Figure 1:
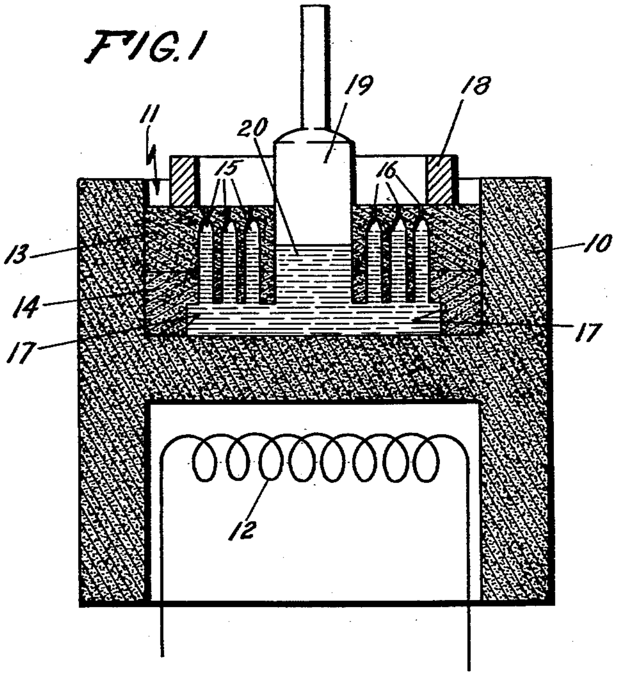
Fig. 1 is a schematic view of the crystal-growing apparatus.

Referring now to Fig. 1, a crystal-growing apparatus illustrating one particular embodiment of this invention is shown, and consists of a container 10 adapted to receive a two-sectional mold 11 in an upper recess thereof and a heating element 12 in a lower recess thereof. For purposes of illustration, it will be assumed that a plurality of germanium single crystals are to be grown. Therefore, the container 10 and the mold 11 should be thermally responsive to the heating element 12 and chemically inert with respect to germanium. High purity graphite fulfills these requirements and has been used successfully to form the container 10 and the mold 11. The container 10 may be cylindrical in shape and the recesses therein are separated from each other by a wall intermediate the top and bottom edges of this container.

The mold 11 is divided into two sections, an upper section 13 and a lower section 14, which are designed to fit securely within the upper recess of the container 10. Each of the sections 13 and 14 has a group of openings therein, and when these openings are properly aligned they form a plurality of small elongated holes 15. These holes may be about 1 mm. in diameter and 10 mm. long, for example, and each is provided with a small outlet 16 located at the top end thereof. The lower section 14 of the mold 11 has a cavity 17 into which each of the holes 15 open. A weight, such as the circular metal ring 18 shown in Fig. 1, is used to hold the two sections of the mold in position. The crystal-growing apparatus is completed with a plunger 19, which also may be made of graphite, designed to move up or down within the central openings located in each of the sections 13 and 14 of the mold 11.

The operation of the crystal-growing apparatus described above may be understood with reference to Fig. 1 wherein an intermediate stage of the growing process is shown. The operation is initiated by first placing a charge of germanium 20, containing a predetermined concentration of arsenic and boron therein, in the cavity 17 and central openings located in the aligned sections 13 and 14 of the mold 11. In this illustration of the invention and as explained below, the concentration of arsenic should substantially exceed that of the boron. The plunger 19 is removed from the apparatus during this initial step and the temperature of the charge 20 is raised to slightly above its melting point, about 950 degrees C., by connecting the heating element 12 to a suitable power supply, not shown. It should be noted that the p-type and n-type doping elements, arsenic and boron, used in this process have been chosen because there is a substantial difference between their respective rates of evaporation. Arsenic is quite volatile and will diffuse toward the surface of the germanium crystal and evaporate when the proper conditions for such evaporation are maintained. However, boron has a very low rate of evaporation and is difficult to segregate from germanium under any conditions.

The process is continued by placing the weight 18 on the upper section 13 of the mold 11 to keep the two sections of the mold in place during this operation. The plunger 19 is then inserted into the central opening located in the mold and is moved down to force the melt of semiconductor material 20 into the holes 15, as shown in Fig. 1. The small outlets 16 are provided so that any pressure which might otherwise build up within the holes 15 may be dissipated during this stage of the process. When the holes are filled with the melt, the plunger motion is stopped and the temperature of the melt is lowered slightly, to a point a few degrees below its melting point, so that the germanium in the holes will begin freezing. Freezing will start at the top end of the holes 15 and will progress slowly downward until each of the holes contains a single crystal of doped germanium.

After cooling the mold 11, the sections 13 and 14 may be removed from the container 10 and the single crystals may be separated from any excess semiconductor material adhering to the lower ends of the crystals. These crystals, which are n-type due to the predominating concentration of arsenic therein, are then placed in a suitable vessel, not shown, which is then evacuated. This vessel and the crystals therein are heated and maintained at a temperature of about 500 degrees C. or above, but should be kept at a temperature below the melting point of germanium. At this temperature arsenic will begin to evaporate from the crystals. Since the atoms of arsenic which are closest to the surface of each crystal will escape more readily than those near the longitudinal axis of the crystal, an exterior layer will be formed along the area of the crystal adjacent to the surface, which is relatively deficient in arsenic. That is, the concentration of arsenic atoms in the crystal become proportional to the distance at which the atoms are located from the surface of the crystal. On the other hand, boron will not leave the crystal under these conditions, so the concentration of boron in the crystal will remain substantially constant throughout the crystal during this evaporation process. As the evaporation of the arsenic atoms continues over a period of time, the surface of the semiconductor crystal and the area adjacent thereto will eventually contain a substantially greater concentration of boron atoms than arsenic atoms. A p-n type junction is created along an internal section of the crystal where the concentration of arsenic and boron atoms are substantially equal. Thus, an exterior or outer layer of the crystal will be changed from n-type germanium to p-type germanium, and the inner core of the crystal will still be n-type germanium because the number of arsenic atoms continues to exceed the number of boron atoms in that area.

Figure 2:
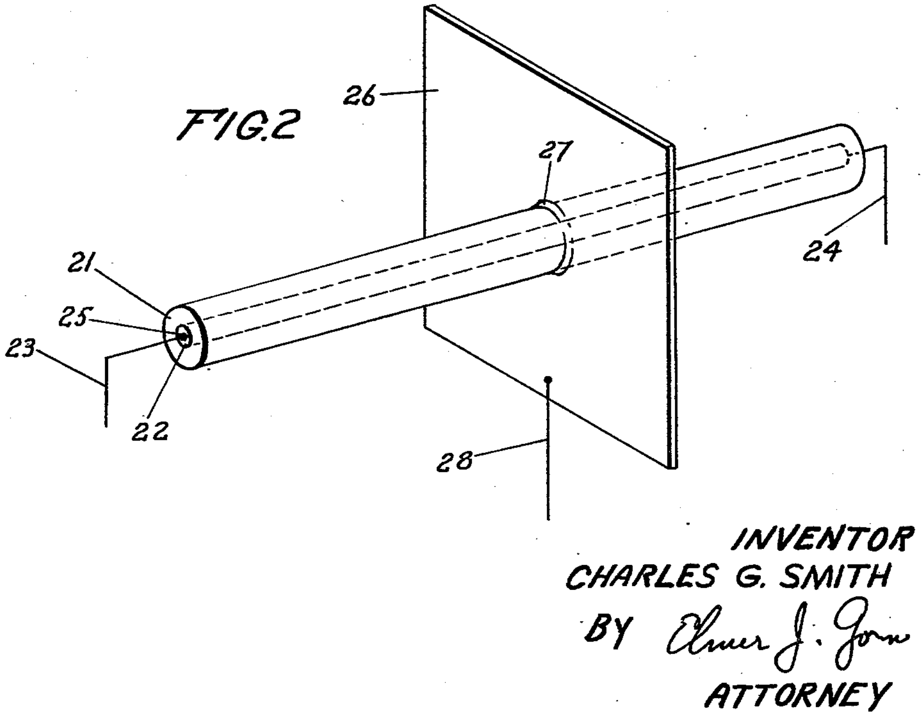
Fig. 2 is a view of a transistor device made in accordance with this invention.

If the evaporation process is continued, the p-type outer layer formed will increase in thickness and the p-n type junction will be located closer to the longitudinal axis of the crystal. Since the thickness of the outer layer of the crystal is directly proportional to the length of time that the process is allowed to proceed, the diameter of the inner core, which determines the electrical resistance of this core, may be made as small as desired. When the junction is properly located, as determined by testing one of the crystals from time to time, the crystals are cooled and the ends are cut off to expose the inner core of n-type semiconductor material, as shown in Fig. 2. The crystals are then etched and leads are attached to the layers as described below.

Referring now to Fig. 2, a transistor having a coaxial single crystal as a part thereof is shown. In accordance with the previously described embodiment of this invention, the crystal has an outer p-type layer 21 which surrounds an n-type core 22. Two leads 23 and 24 are connected to opposite ends of the n-type core 22 with an n-type metal 25, such as antimony solder, for example. A sheet of metal 26, for example, a fernico sheet may be used successfully for this purpose, is also joined to the surface of the p-type layer 21. This sheet is provided with a centrally located hole through which the crystal may be inserted. The sheet may then be soldered to the crystal with a ring of p-type metal 27, such as indium alloy solder, for example. It should be noted that the sheet 26 is relatively large in size so that it not only provides a contact with the p-type layer 21, but also is able to conduct heat away from the crystal during the operation of the transistor. In operation, a third lead 28, which is connected to the sheet 26, may be biased negatively with respect to the leads 23 and 24, and a signal may be passed between these end leads to cause a current to flow along the n-type core 22, thereby modulating the current to the third lead 28. Likewise, as an alternative method, a signal could be modulated by putting the signal into the third lead 28 so that the current between leads 23 and 24 is modulated.

It should be noted that the structure of the elongated crystal, wherein the n-p type junction is spread over a relatively large area in a coaxial crystal, considerably improves the transistor action described above. Since the p-n type junction is almost entirely removed from the external surface of the crystal, it has been determined that transistor noise, which is substantially proportional to the exposed surface area of the junction, is decreased. Also when using the methods previously described for modulating a signal, it is often desirable to pass only a small current between the leads 23 and 24. The small cross-section of the n-type core 22 provides a high resistance to any signal impressed across it so that the transistor action may also be improved in this respect.

However, it should be understood that this invention is not limited to the particular details described above, as many equivalents will suggest themselves to those skilled in the art. For example, the mold 11 may be adapted to form many crystals during one operation and these crystals may be made any size desired. Likewise, the p-type and n-type elements used to dope the semiconductor material may be selected from groups III and V of the periodic table of the elements and are not limited to boron and arsenic. Also, the semiconductor material employed could be silicon as well as germanium. Furthermore, the concentrations of the p-type and n-type elements may be varied so long as the one having the higher rate of evaporation from the semiconductor material is initially present in the greater concentration. Therefore, it is desired that the appended claims be given a broad interpretation commensurate with the scope of the invention within the art.

What is claimed is:

1. The method of making junction type semiconductor crystals which consists in forming a single crystal of semi-conductor material selected from the group comprising germanium and silicon, said material having a predetermined concentration of a p-type doping element and an n-type doping element therein, said elements each having a substantially different rate of evaporation from said material, and an evaporation temperature which is below the melting temperature of said material, the initial concentration of said element having the higher rate of evaporation being greater than the concentration of the other of said elements, heating and maintaining said crystal at an elevated temperature for a sufficient length of time to cause the concentration of said element having the higher rate of evaporation to fall below the concentration of the other of said elements in an exterior layer of said crystal.

2. The method of making junction type semiconductor crystals which consists in forming a single crystal of semi-conductor material selected from the group comprising germanium and silicon, said material having a predetermined concentration of a p-type doping element and an n-type doping element therein, said elements each having a substantially different rate of evaporation from said material, and an evaporation temperature which is below the melting temperature of said material, the initial concentration of said element having the higher rate of evaporation being greater than the concentration of the other of said elements, placing said crystals in an evacuated chamber, heating and maintaining said crystal at an elevated temperature in said chamber for a sufficient length of time to cause the concentration of said element having the higher rate of evaporation to fall below the concentration of the other of said elements in an exterior layer of said crystal.

3. The method of making junction type semiconductor crystals which consists in forming a single crystal of semi-conductor material selected from the group comprising germanium and silicon, said material having a predetermined concentration of a p-type doping element and an n-type doping element therein, said elements each having a substantially different rate of evaporation from said material, and an evaporation temperature which is below the melting temperature of said material, the initial concentration of said element having the higher rate of evaporation being greater than the concentration of the other of said elements, heating and maintaining said crystal at a temperature of the order of 500 degrees C. for a sufficient length of time to cause the concentration of said element having the higher rate of evaporation to fall below the concentration of the other of said elements in an exterior layer of said crystal.

4. The method of making junction type semiconductor crystals which consists in forming a single crystal of semiconductor material selected from the group comprising germanium and silicon, said material having a predetermined concentration of boron and arsenic therein, said boron and arsenic each having a substantially different rate of evaporation from said crystal, and an evaporation temperature which is below the melting temperature of said material, the initial concentration of said arsenic being greater than the concentration of said boron, heating and maintaining said crystal at an elevated temperature for a sufficient length of time to cause the concentration of said arsenic to fall below the concentration of said boron in an exterior layer of said crystal.

References Cited in the file of this patent

UNITED STATES PATENTS

| | | |
|---|---|---|
| 2,415,841 | Ohl | Feb. 18, 1947 |
| 2,462,218 | Olsen | Feb. 22, 1949 |
| 2,485,069 | Scaff | Oct. 18, 1949 |
| 2,589,658 | Bardeen | Mar. 18, 1952 |
| 2,703,296 | Teal | Mar. 1, 1955 |
| 2,714,183 | Hall | July 26, 1955 |